Aug. 21, 1951  L. S. VERMILLION  2,564,741
DYNAMOELECTRIC MACHINE
Filed March 6, 1947  3 Sheets-Sheet 1

INVENTOR
Lewis S. Vermillion
William B. Jaspert
BY
ATTORNEY

Patented Aug. 21, 1951

2,564,741

UNITED STATES PATENT OFFICE 2,564,741

DYNAMOELECTRIC MACHINE

Lewis Safford Vermillion, Pittsburgh, Pa.

Application March 6, 1947, Serial No. 732,732

2 Claims. (Cl. 171—252)

This invention relates to new and useful improvements in dynamoelectric machines, and it is among the objects thereof to provide a dynamoelectric machine having a rotating field and a rotating armature revolving in opposite directions, to generate a given electromotive force with electrical windings and magnetic cores of approximately one-half the size and capacity of that normally required in a conventional form of apparatus, or to increase the electromotive force or capacity of a normally conventional form of apparatus in which only the field or the armature revolves.

Another object of the invention is the provision of a dynamoelectric apparatus of the above designated character in which the armature will be the outer windings of the dynamoelectric machine mounted on a cage to be rotatable inside a housing, the field winding being actuated by a drive shaft which also revolves the cage.

The invention further contemplates the use of field shunt coils, main series field coils and commutating coils, while the armature is connected in series with commutating coils and with series coils on main pole pieces.

Figure 1:
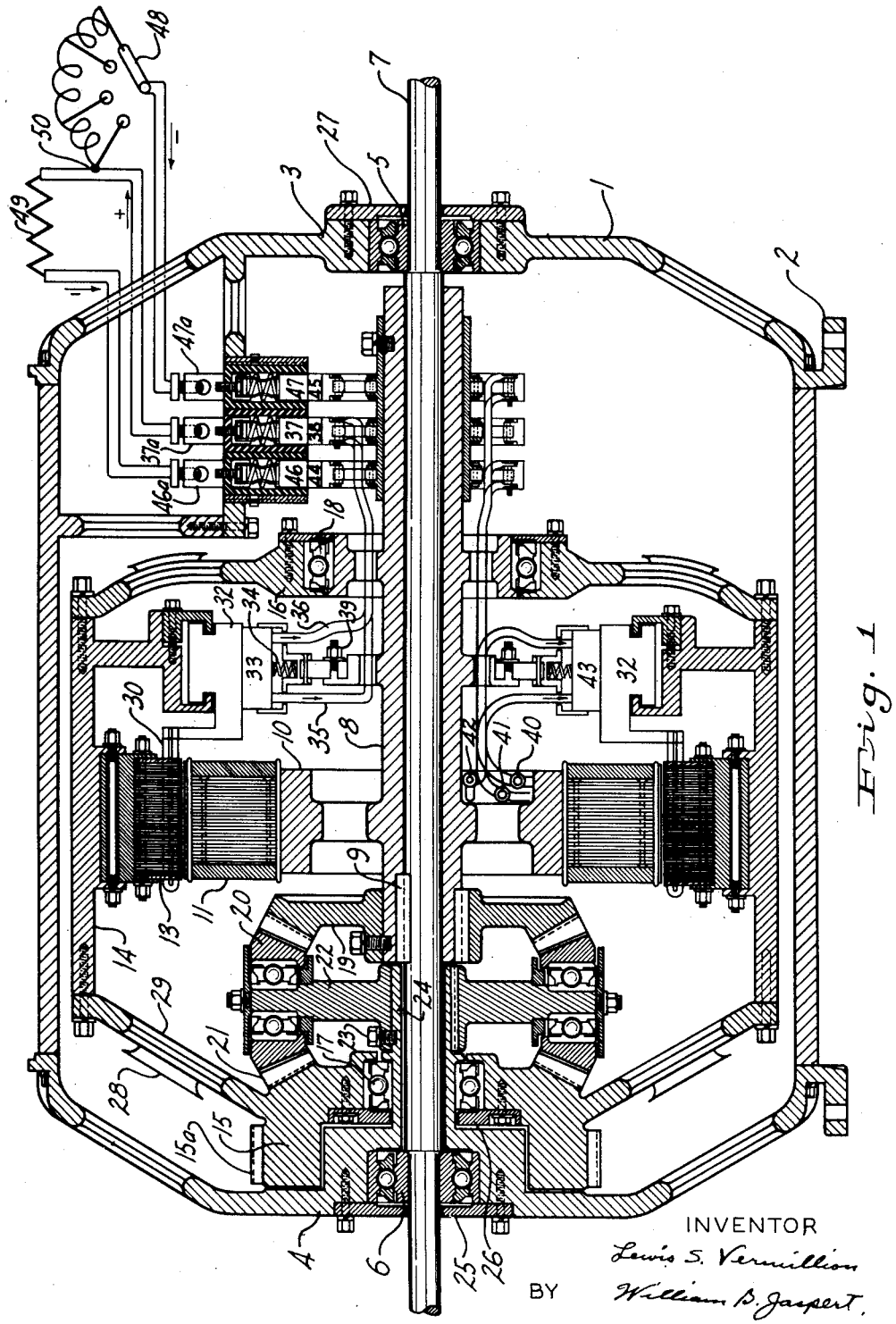
Figure 2:
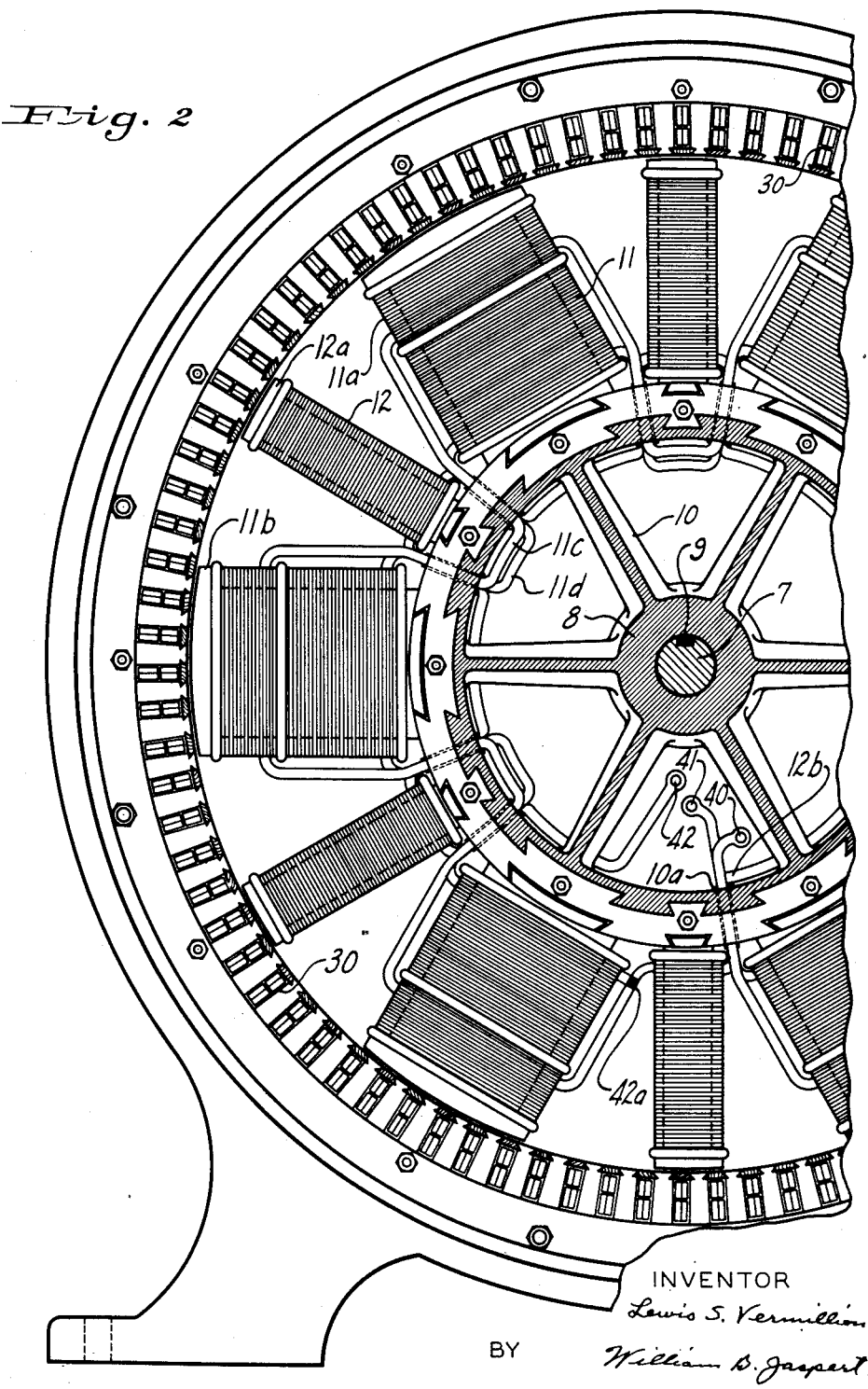
Figure 3:
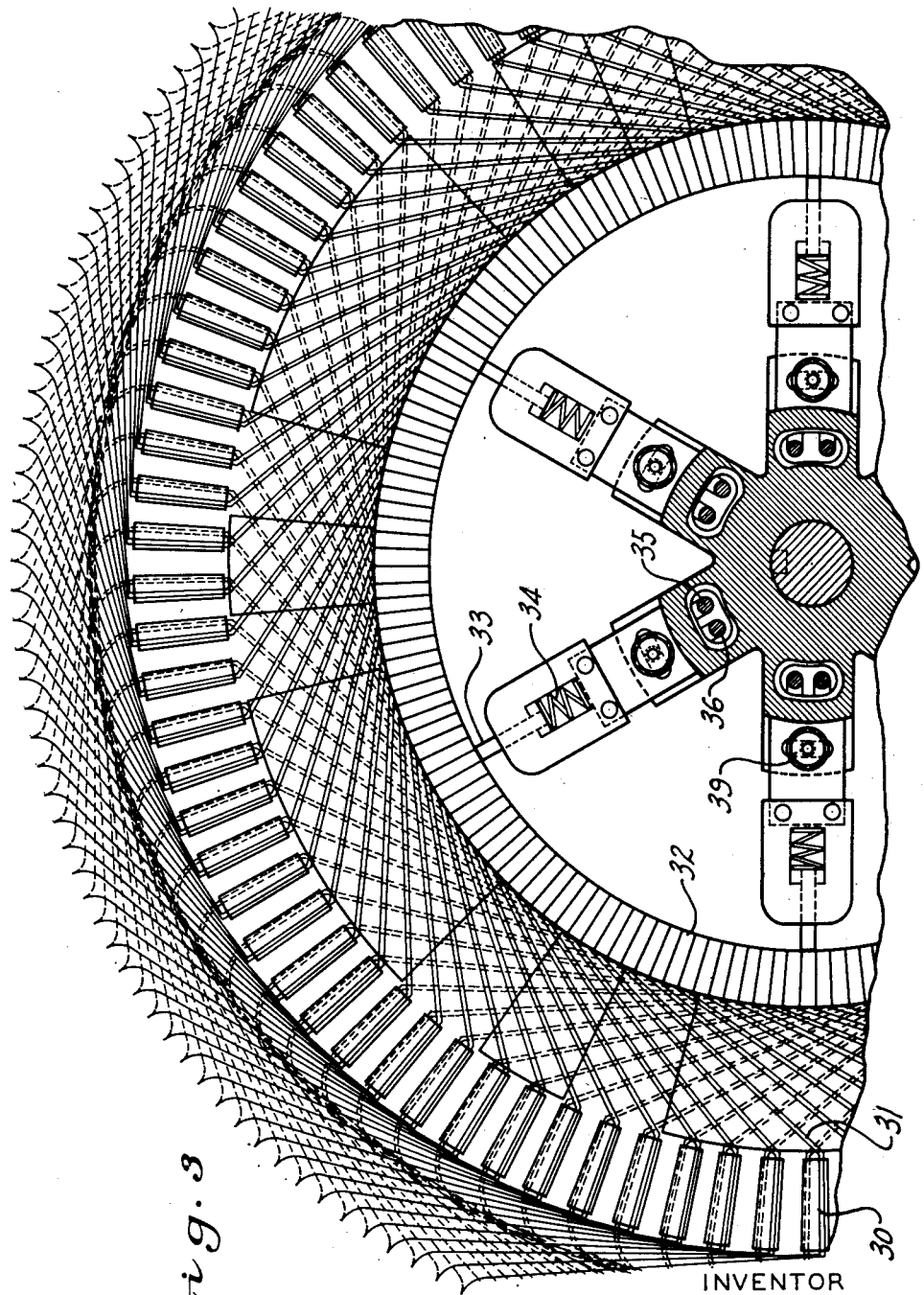

These and other objects of the invention will become apparent from a consideration of the accompanying drawings, constituting a part hereof, in which like reference characters designate like parts, and in which Fig. 1 is a vertical cross-sectional view of a dynamoelectric machine embodying the principles of this invention;

Fig. 2 an end elevational view of the armature and field coils, mountings and connections; and Fig. 3 an end elevational view of the commutator and armature bars and segments with their interrelated windings diagrammatically shown.

With reference to the several figures of the drawings, the numeral 1 designates a housing 1 provided with legs 2 by which it may be bolted to a bed or other suitable support, the housing 1 having end brackets or ribs 3 and 4 provided with antifriction bearings 5 and 6 for journaling a drive shaft 7 which is driven or rotated by a motor or other prime mover.

Mounted on the shaft 7 for rotation therewith is a hollow shaft 8 keyed to shaft 7 at 9 and which has a spider 10 formed integrally therewith, the spider carrying a plurality of series coils 11a and shunt coils 11, and commutating coils 12, Fig. 2, which constitute part of the field windings.

A rotating armature 13 is mounted on a cage 14, the end brackets 15 and 16 of which are provided with anti-friction bearings 17 and 18 respectively, by which the cage member is free to rotate in the direction opposite to the direction of rotation of the hollow shaft 8. The cage 14 is driven through a set of bevel gears by means of the drive gear 19 interacting with a plurality of planetary gears 20 that mesh with the teeth 21 of a bevel gear integrally formed on the end bracket 15 of the cage.

The planetary gears 20 are mounted on two stationary posts 22 which are fastened by a screw 23 in a horizontal position to the extension sleeve 24 of the end bracket 4 of the main housing 1. Bearing seals 25 and 26 are provided for the bearings 6 and 17 respectively, and an end cap 27 is provided to seal off the bearing 5.

The cage 14 can also be driven through the gear wheel 15a by a motor (not shown) which will rotate the cage 14 direct and which in turn, through gear wheels 20 and 21, will cause gear 19 to rotate which actuates the hollow shaft 8, spider 10 and field coils 11a, 11 and 12 to revolve in the opposite direction to that of the cage and armature coils. The rotating cage member 14 is provided with fan blades 28 for scooping up cooling air which is transmitted through the openings 29 in the cage to the interior for cooling the field and armature windings.

As shown in Fig. 3, the armature bars 30 are connected by windings or risers 31 to commutator segments 32 which are engaged by brushes 33 biased by springs 34 to maintain contact with the segments 32. The brushes are connected by conductors 35 and 36 to slip ring 38 that engages brush 37 as shown in Fig. 1.

As shown in Fig. 2, the spider 10 carries a plurality of field shunt coils 11 and main series field coils 11a and commutating coils 12. The commutating coils 12 are connected in series with the armature and with the series coils 11a on the main pole pieces.

The magnetomotive forces or flux of the shunt field coils 11 and series field coils 11a act in unison to set up and maintain fluxes in the cores of the main field magnets or cores designated by the numeral 11b. The magnetomotive forces or fluxes of the commutator coils 12 establish a flux that partly neutralizes the stray or undesirable fluxes set up by the armature conductors 30. The stray and undesirable flux set up by the armature conductors causes sparking and arcing at the contact between the brushes 33 and the armature segments 32. In addition to the commutator coil flux to correct this undesirable commutator sparking and arcing condition, there can be an adjustment of the brushes by means of the bolts 39, Figs. 1 and 3.

Coils 11, 11a and 12 are connected to terminals 40, 41 and 42, as shown in Figs. 1 and 2. Terminal 40 is connected to slip ring 44, brushes 46, post 46a and to the load at 49. It is also the terminal for one end of the series field circuit. Terminal 41 is connected to slip ring 45, brushes 47, post 47a, and to the resistance through the resistance arm 48. It is also one end of the shunt field circuit. Terminal 42 is connected to the negative brushes 43 and through the commutating coil circuit to 42a, Fig. 2, at the end of the shunt and series field circuits.

In tracing the circuit, the electromotive force is generated in the armature conductors or bars 30, Fig. 3, which flows through the conductors or risers at 31, through the positive commutator segments 32, through the positive brushes 33, through the conductors 35 and 36, Fig. 1, to the collector ring 38, through the brushes 37, through the post 37a to the point 50 at the connection between the resistance and load.

Part of the E. M. F. is then returned through the load 49, through the negative conductor, through post 46a, through brush 46, through slip ring 44, to terminal 40, through the spider rim at 10a, Fig. 2, through the series field coils 11a, through the series field circuits at 11c to the point 42a, Fig. 2, where it ends. The other part of the E. M. F. returns through the resistance and arm 48, Fig. 1, and negative circuit to post 47a, through brushes 47, slip rings 45 through conductors to terminal 41, through the spider rim at 10a, Fig. 2, through the shunt field coils 11, through the shunt field circuits at 11d to the point 42a, Fig. 2, where it also ends.

The E. M. F. then flows from points 42a, Fig. 2, through the commutating coils 12, through the circuits 12b to the terminal 42 shown on Figs. 1 and 2. The E. M. F. then flows through the conductors to the negative brushes 43, and commutator segments 32, through the conductors or risers 31 into the armature bars or windings where it is regenerated. As the flux from the rotating field coils 11 and 11a is cut by the parallel rotating armature coils 30, an electromotive force is induced or generated in the rotating armature coils of approximately double the value for similar size windings if only one of the parts were rotating at the same speed. This may necessitate larger size windings in the armature to carry the increased flux.

The operation of the above described dynamoelectric machine is briefly as follows.

When the shaft 7 or gear 15 is rotated and the field and armature revolve in opposite directions, it will operate as a generator but will not be connected to an external circuit.

When so running the magnetomotive forces of the shunt field coils 11 produce the flux of the magnetic field of the machine, but as both the shunt current in field coils 11 and the number of turns of the commutating coils 12 are small, the magnetomotive forces are of low value. When the external circuit is closed, current is established in the main series field coils 11a, and the commutating pole coils 12, the fluxes in the cores of the main field coil magnets 11b are increased, and a higher E. M. F. is generated.

If the load on the generator is still further increased, the exciting current through the series field coils increases thus building up the fluxes in the magnetic cores still further and generating a still higher E. M. F. The higher E. M. F. is desired because of increased drop in voltage necessary to force the larger load current through the armature, the external circuit, the series field coils, and commutating coils.

The magnetic cores of both armature and field are obviously constructed of "laminated electric steel disc" to minimize hysteresis and eddy current losses.

It is evident from the above description of this invention that a generator embodying the principles herein set forth will have the capacity of generating a maximum E. M. F. for a minimum armature and field coil structure, thereby reducing the size of such machines; or, stating it another way, increasing the capacity of dynamoelectric equipment sized according to conventional designs in which one of the elements, namely, the field or the armature revolves while the other remains stationary.

Although one embodiment of the invention has been herein illustrated and desribed, it will be evident to those skilled in the art that various modifications may be made in the details of construction without departing from the principles herein set forth.

I claim:

1. In a dynamoelectric machine, a housing, a shaft journaled in said housing, a hollow shaft mounted on said first-named shaft for rotation therewith, said hollow shaft having a spider for supporting magnetic cores and field windings, a cage mounted for rotation around said hollow shaft for supporting a revolving armature in alignment with said cores and windings of said hollow shaft spider, transmission gearing connecting said hollow shaft and cage to effect rotary movement of the cage in a direction opposite to the direction of rotation of the hollow shaft, a commutator mounted on and inside said cage, commutator brushes mounted on said hollow shaft for engaging the commutator segments, collector rings mounted on said hollow shaft outside the cage and having electrical connections with stationary brushes, some of said rings having electrical connections with the field windings of said hollow shaft through the said commutator, and terminal posts for said stationary collector ring brushes for effecting outside connections with a variable resistance and load.

2. In a dynamoelectric machine, a housing, a shaft journaled in said housing, said housing having an inwardly directed sleeve at one end for supporting radial pinion arms within the housing, said sleeve having an inner bearing for journaling said shaft and an outer bearing for journaling one side of a rotating cage, a spider sleeve mounted on said first-named shaft and having a gear interacting with the teeth of gears carried by the pinion arms mounted on the housing sleeve, a cage having one end journaled on said spider sleeve and having its other end journaled on the housing sleeve bearing, said cage having gear teeth interacting with the gears on said pinion arms, said spider sleeve and cage having electrical windings and connections constituting a field and armature respectively of a generator which, when the spider sleeve and cage are subjected to rotation in opposite directions, generate an E. M. F.

LEWIS SAFFORD VERMILLION.

REFERENCES CITED

The following references are of record in the file of this patent:

UNITED STATES PATENTS

| Number | Name | Date |
|---|---|---|
| Re. 14,282 | Morrison | Apr. 3, 1917 |
| 251,555 | Edison | Dec. 27, 1881 |
| 265,784 | Edison | Oct. 10, 1882 |
| 432,142 | Knight | July 15, 1890 |
| 467,048 | Palmer | Jan. 12, 1892 |
| 859,369 | Collins | July 9, 1907 |
| 1,017,510 | Casterline | Feb. 13, 1912 |
| 1,464,684 | Stoppenbach | Aug. 14, 1923 |
| 2,093,077 | Fraser | Sept. 14, 1937 |
| 2,137,738 | Faubian | Nov. 22, 1938 |
| 2,388,498 | Reinhard | Nov. 6, 1945 |